United States Patent
Coeffe

(10) Patent No.: US 9,909,371 B2
(45) Date of Patent: Mar. 6, 2018

(54) ASSEMBLY FOR PRODUCING A THREADED CONNECTION, METHOD FOR MAKING UP AND BREAKING OUT SAID CONNECTION AND USE OF SAID CONNECTION IN A WORK OVER RISER

(75) Inventor: Guillaume Coeffe, Paris (FR)

(73) Assignees: VALLOUREC OIL AND GAS FRANCE, Aulnoye-Aymeries (FR); SUMITOMO METAL INDUSTRIES, LTD., Osaka-shi (JP)

( * ) Notice: Subject to any disclaimer, the term of this patent is extended or adjusted under 35 U.S.C. 154(b) by 997 days.

(21) Appl. No.: 13/511,197

(22) PCT Filed: Nov. 23, 2010

(86) PCT No.: PCT/EP2010/007092
§ 371 (c)(1),
(2), (4) Date: May 22, 2012

(87) PCT Pub. No.: WO2011/063931
PCT Pub. Date: Jun. 3, 2011

(65) Prior Publication Data
US 2012/0235404 A1    Sep. 20, 2012

(30) Foreign Application Priority Data

Nov. 27, 2009  (FR) ..................... 09 05713

(51) Int. Cl.
*E21B 17/043* (2006.01)
*E21B 17/08* (2006.01)
(Continued)

(52) U.S. Cl.
CPC ............ *E21B 17/043* (2013.01); *E21B 17/08* (2013.01); *F16L 15/001* (2013.01); *F16L 15/08* (2013.01); *Y10T 29/49826* (2015.01)

(58) Field of Classification Search
CPC ........ E21B 17/043; E21B 17/08; F16L 15/08; F16L 15/001; Y10T 29/49826
(Continued)

(56) References Cited

U.S. PATENT DOCUMENTS 1,054,812 A   3/1913  Zierath
1,781,091 A  11/1930  Wilson
(Continued)

FOREIGN PATENT DOCUMENTS

EP      0 060 549      9/1982

OTHER PUBLICATIONS

American Petroleum Institute, "Specification for Casing and Tubing", API Specification 5CT/ISO 11960, Jul. 1, 2005.
(Continued)

*Primary Examiner* — Gregory J Binda
*Assistant Examiner* — Zachary T Dragicevich
(74) *Attorney, Agent, or Firm* — Oblon, McClelland, Maier & Neustadt, L.L.P.

(57) ABSTRACT

An assembly for producing a threaded connection, including first and second tubular components with an axis of revolution, each including at one end a male threaded zone produced on the external circumferential surface, the ends each finishing in a terminal surface forming a direct drive dog clutch device to fix the first and second tubular components in rotation, and including a third tubular component which also has an axis of revolution and includes at each end on its internal circumferential surface two female threaded zones, one of the two male threaded zones being capable of cooperating with one of the two female threaded zones while the other male threaded zone can co-operate with the other female threaded zone. The male end of the first tubular component and the corresponding female end of the third tubular component include a mechanism for free rotation.

12 Claims, 4 Drawing Sheets

(51) Int. Cl.
*F16L 15/00* (2006.01)
*F16L 15/08* (2006.01)

(58) Field of Classification Search
USPC .................................................. 285/333, 334
See application file for complete search history.

(56) References Cited

U.S. PATENT DOCUMENTS

| | | | |
|---|---|---|---|
| 4,099,745 | A | 7/1978 | Cobbs |
| 4,796,923 | A * | 1/1989 | Liggins et al. ................. 285/27 |
| 4,907,828 | A | 3/1990 | Chang |
| 5,474,334 | A | 12/1995 | Eppink |
| 5,794,985 | A | 8/1998 | Mallis |
| 6,860,525 | B2 | 3/2005 | Parks |
| 7,478,842 | B2 | 1/2009 | Reynolds, Jr. et al. |
| 2003/0122373 | A1 | 7/2003 | Hirth et al. |
| 2005/0236834 | A1* | 10/2005 | Curley et al. ................. 285/333 |
| 2006/0273586 | A1 | 12/2006 | Reynolds, Jr. et al. |
| 2007/0063513 | A1 | 3/2007 | Boyd |

OTHER PUBLICATIONS

VAM/Field Service International, "Running book", VAM/Field Service International, 2001, 275 pages.
International Search Report dated Dec. 28, 2010 in PCT/EP10/007092 Filed Nov. 23, 2010.
U.S. Appl. No. 13/517,204, filed Jun. 19, 2012, Coeffe.

\* cited by examiner

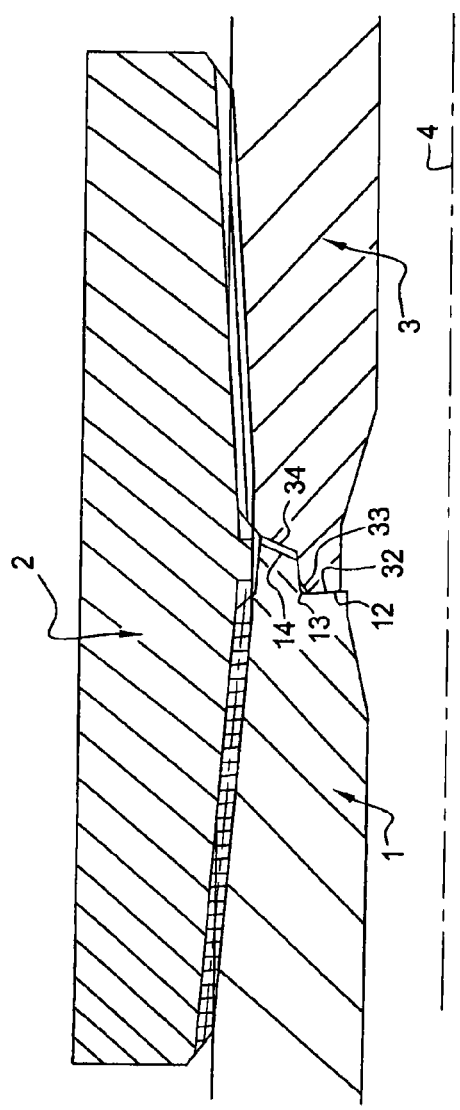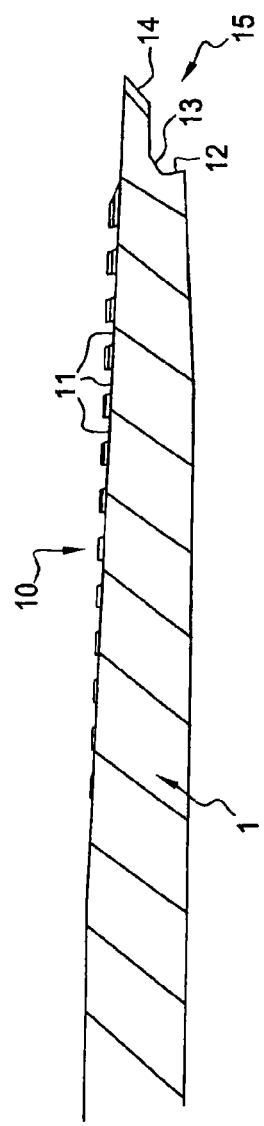

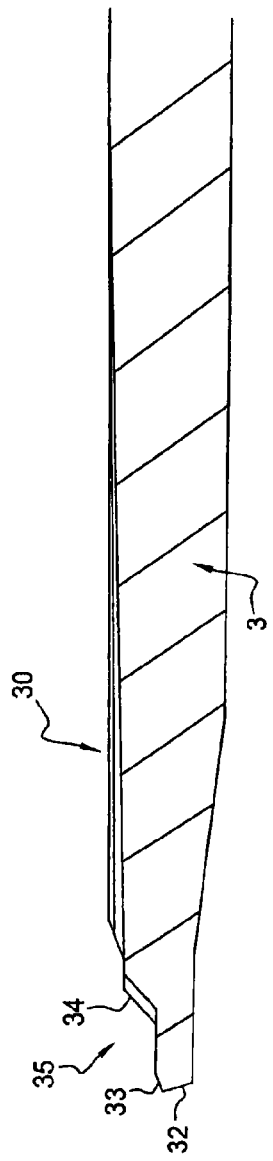
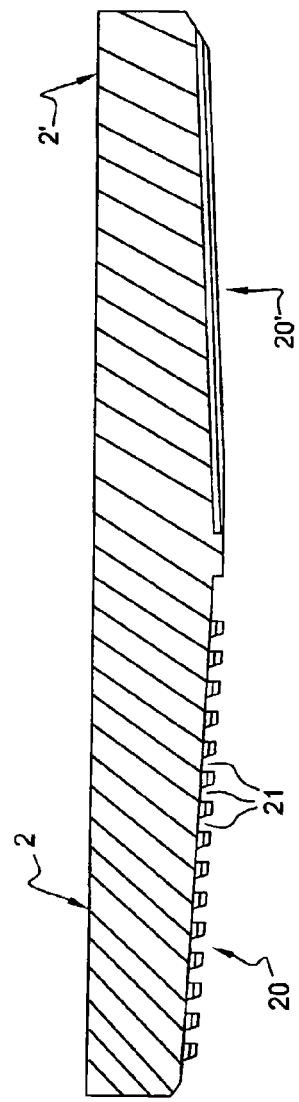
Fig. 3
Fig. 4

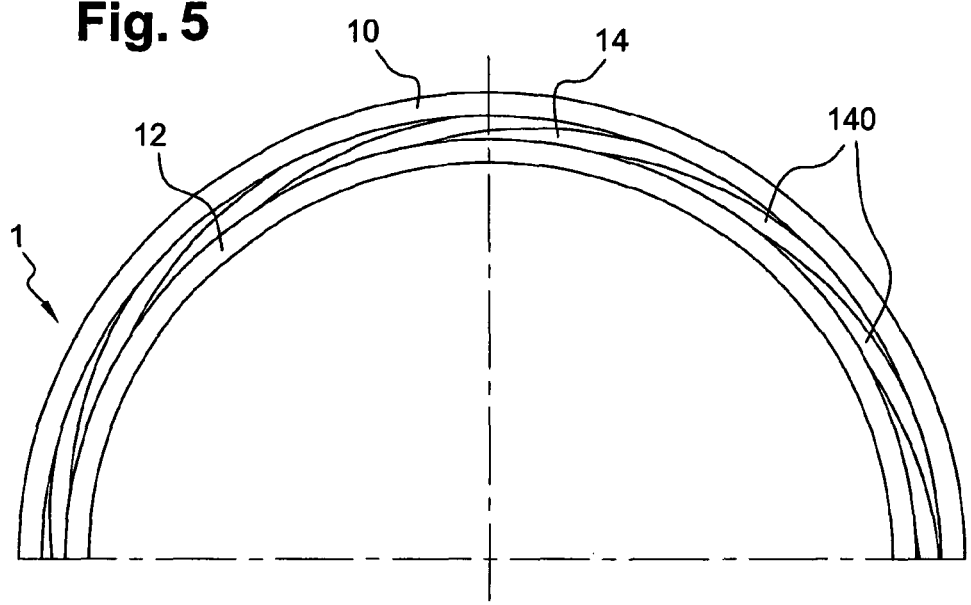
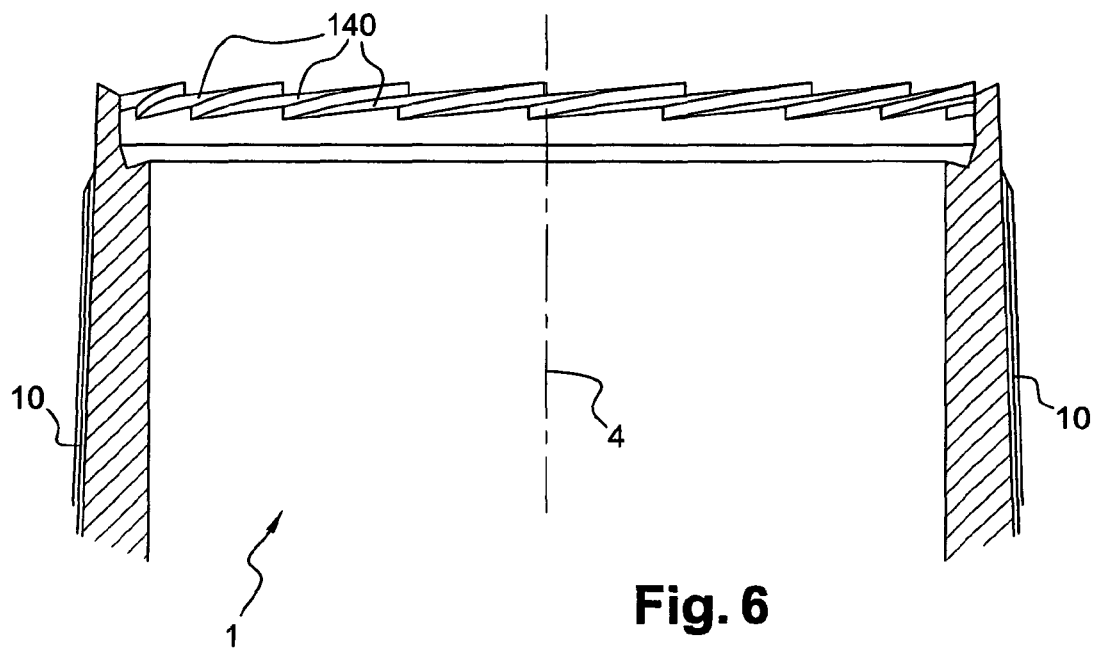

ASSEMBLY FOR PRODUCING A THREADED CONNECTION, METHOD FOR MAKING UP AND BREAKING OUT SAID CONNECTION AND USE OF SAID CONNECTION IN A WORK OVER RISER

The present invention relates to an assembly for producing a threaded connection used for drilling or operating hydrocarbon wells. The assembly comprises a first and a second tubular component each provided at one of its ends with a male type threaded zone, and a third tubular component which is preferably shorter than the first two and provided at each of its ends with a female type threaded zone which on screwing is capable of co-operating with said male threaded zones. The invention also relates to a method for making up said assembly and to a threaded connection resulting from makeup of said assembly.

The term "component used for drilling and operating hydrocarbon wells" means any element which is substantially tubular in shape intended to be connected to another element of the same type or otherwise to thereby constitute either a string which is capable of drilling a hydrocarbon well or a work-over riser used for maintenance, for example, or a casing string or tubing involved in operation of a well.

The term "connection" also means the connection between the tubular components. Two great length tubes may be connected by making up the end provided with a male threading of one into the end provided with a female threading of the other. Two great length tubes may be connected using a much shorter tubular component, also termed a coupling, by making up each of the female ends of the coupling with the male threaded end of great length tubular components.

Components used for drilling applications or for operating a hydrocarbon well are made up together with a high makeup torque. This high torque is generally achieved by means of tightening co-operation of abutment surfaces provided on each of the components, or by means of threadings which are termed self-locking. However, certain applications induce high stresses, such as in risers. For this reason, higher makeup torques have to be used in order to prevent the components from unscrewing. However, the makeup torques are limited by the risks of plastification. Thus, the connections have to be adapted in order to accommodate the risk of inopportune unscrewing.

Developments have been made in order to overcome these disadvantages. Thus, document U.S. Pat. No. 5,794,985 proposes a connection with a coupling wherein the ends of the male components are fitted one into the other in order to prevent rotation, and as a consequence to prevent breakout, of the components independently of each other. However, although that arrangement renders breakout difficult, it also complicates makeup of the male components into the coupling. In fact, the male components have to be positioned with respect to each other so that their ends can be fitted together and be made up simultaneously into the coupling without offsetting them angularly from each other.

The invention concerns an assembly of tubular components which can be screwed one into the other readily in order to produce a connection with a lower risk of inopportune unscrewing when the connection is functioning.

More precisely, an assembly for producing a threaded connection comprises a first and a second tubular component with the same axis of revolution, each provided at one of their ends with a male threaded zone produced on the external circumferential surface, said ends each finishing in a terminal surface provided with a direct drive dog clutch device in order to fix the first and second tubular components in rotation. The assembly comprises a third tubular component also with an axis of revolution and is provided at each of its ends on its internal circumferential surface with two orientated female threaded zones, one of the two male threaded zones being capable of co-operating by screwing with one of the two female threaded zones, while the other male threaded zone is capable of co-operating by screwing with the other female threaded zone. The male end of the first tubular component as well as the corresponding female end of the third tubular component comprise means for free rotation such that at the end of makeup of said male threaded zone into said female threaded zone, the tubular components carrying said male and female threaded zones are freely rotational with respect to each other.

Optional characteristics of the invention which may be complementary or substitutional are described below.

The male threaded zones of the first and second components may be orientated in the reverse direction with respect to each other.

The third tubular component length may be at least 10 times shorter than the first two components.

The means for free rotation may comprise grooves which are excavated perpendicularly to the axis of revolution in said male and female threaded zones, such that once said male and female threaded zones have been made up one into the other, each interposed zone defined by two consecutive grooves provided on one of said threaded zones faces a groove provided on the other threaded zone.

Said grooves may be disposed in a regular manner at a lead substantially equal to 1.5 times the lead of the threaded zones.

The terminal surfaces of the male ends of the first and second tubular components may each comprise a circular portion provided with inclined facets disposed in a concentric manner, such that said portions, which thus constitute the direct drive dog clutch device, fit one into the other.

The terminal surfaces of the male ends of the first and second tubular components may each comprise a sealing surface which can co-operate one with the other to form a metal/metal seal.

The terminal surfaces of the male ends of the first and second tubular components may each comprise an abutment surface which can co-operate one with the other by tightening.

On each terminal surface, the sealing surface may be disposed between the circular portion and the abutment surface, the circular portion being further from the axis 4 of the connection than the abutment surface.

The male threaded zones as well as their corresponding female threaded zone may exhibit a taper generatrix so as to facilitate mutual screwing of the tubular components.

The method for making up an assembly in accordance with the invention comprises:

screwing a first component, the male threaded zone of which is provided with means for free rotation in the corresponding female threaded zone of the third component, until said components are freely rotational with respect to each other;

then screwing the second component into the corresponding female threaded zone of the third component until the terminal surfaces of the first and second tubular components are fitted one in the other, said fitting being rendered possible by the free rotation of the first tubular component;

then screwing the third component with the first and second components being fixedly fitted together, to a predetermined torque C0.

The method for breaking out an assembly in accordance with the invention comprises:
unscrewing the male second tubular component from the first and third components;
then unscrewing the first component from the third component.

The invention also pertains to the use of a threaded connection in a work-over riser.

The characteristics and advantages of the invention will be disclosed in more detail in the following description, made with reference to the accompanying drawings.

FIG. 1 is a diagrammatic longitudinal sectional view of a connection resulting from connecting an assembly of tubular components by makeup;

FIG. 2 is a detailed diagrammatic longitudinal sectional view of a first tubular component of the connection of FIG. 1;

FIG. 3 is a detailed diagrammatic longitudinal sectional view of a second tubular component of the connection of FIG. 1;

FIG. 4 is a detailed diagrammatic longitudinal sectional view of a third tubular component of the connection of FIG. 1;

FIG. 5 is a diagrammatic view of the end of the first tubular component of the connection of FIG. 1;

FIG. 6 is a diagrammatic longitudinal sectional view of the first tubular component of the connection of FIG. 1;

FIG. 1 shows a threaded connection resulting from connecting an assembly of tubular components, said connection having an axis of revolution 4.

Figure 7:
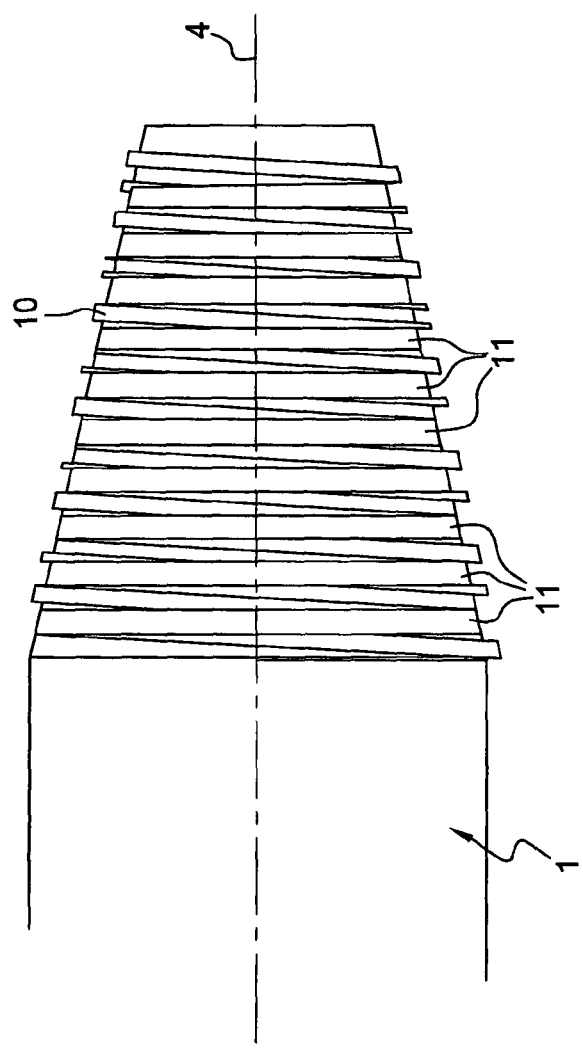
FIG. 7 is a diagrammatic top view of the first tubular component of the connection of FIG. 1.

As can be seen in FIG. 2, this assembly constitutes a first tubular component with an axis of revolution 4 provided at one of its ends 1 with a male threaded zone 10 produced on the external circumferential surface of said component. The term "circumferential surface" means the surface which extends longitudinally over the whole circumference of the tubular component. In contrast, the surfaces that extend radially at the free edges of the tubular component are not considered to be circumferential surfaces.

The term "threaded zone" means any zone which belongs to the circumferential surface of the tubular component and which comprises a threading, the threading possibly being continuous, interrupted, multiple, single, regular, irregular, etc. The end 1 finishes in a terminal surface 15.

The term "terminal surface" means the surface that extends at the free edge of the end 1 of the component over the thickness thereof. In other words, the distal surface is in the form of an annular surface orientated generally radially with respect to the axis 4 of the connection.

As can be seen in FIG. 3, this assembly also comprises a second tubular component with the same axis of revolution 4 and provided at one of its ends 3 with a male threaded zone 30 produced on the external circumferential surface of said component. Said end 3 finishes in a terminal surface 35.

As can be seen in FIG. 4, this assembly also comprises a third tubular component with the same axis of revolution 4 and provided at each of its ends 2, 2' with a female threaded zone 20, 20' produced on the internal circumferential surface of said component.

As can be seen in FIG. 1, the male threaded zone 10 of the first tubular component is capable of co-operating on screwing with one of the two female threaded zones 20 of the third tubular component. The male threaded zone 30 of the second tubular component is capable of co-operating on screwing with the other of the two female threaded zones 20' of the third tubular component.

The first and second tubular components are capable of being fixed to each other in rotation using a direct drive dog clutch 14, 34. The term "direct drive dog clutch" means any device for directly coupling two mechanical parts using teeth, notches, grooves, etc, for example, which means that said mechanical parts can be fixed in rotation.

As can be seen in FIGS. 2 and 4, the end 1 of the first tubular component and the corresponding female end 2 of the third tubular component comprise means for free rotation 11, 21. The term "means for free rotation" means any arrangement such that, at the end of screwing of the male threaded zone 10 into the corresponding female threaded zone 20, the first and third tubular components are free to rotate with respect to each other, ignoring friction. In the variation in FIGS. 2 and 4, this arrangement is provided on said threaded zones.

The assembly described above can thus constitute a connection provided with an "anti-unscrewing" function. The term "anti-unscrewing function" means the ability of the connection not to unscrew at an inopportune moment, i.e. when not desired. More specifically, a connection provided with such a function must not unscrew when, for example, it is subjected to torsional stresses during operation.

The anti-unscrewing function of such a connection is linked to the fact that it is not possible to take apart the first tubular component from the second by exerting a torsional torque between the two components. The direct drive dog clutch blocks rotation of one with respect to the other.

In a preferred embodiment, the male threaded zones 10; 30 are orientated in opposing directions. Thus, the male threaded zone 10 of the first component could be orientated in the clockwise direction and the male threaded zone 30 of the second component could be orientated in the anticlockwise direction. To reiterate, the female threaded zones are orientated in the same direction as the corresponding male threaded zone. In fact, if the male threaded zones of the first and second tubular components are orientated in opposite directions, the two female threaded zones of the third component are also orientated in the mutually opposite directions. The advantage of this configuration resides in the fact that the anti-unscrewing function of the connection is reinforced.

It is not possible in this case to take apart the first tubular component from the third by exerting a torsional torque between the two components. In fact, rotation of the first tubular component in the direction of screwing causes the second component to rotate in the direction of screwing as well. This has the effect of compressing the terminal surfaces against each other.

In a preferred embodiment, the third tubular component is at least 10 times shorter than the first two components. In other words, the third component is a short tube termed a "coupling" which is intended to connect the first two components which are great length tubes. This is termed a T&C, threaded and coupled, connection. In this type of configuration, the torsional stresses firstly affect two consecutive great length tubes and not one great length tube and the coupling to which it is connected. As a result, the anti-unscrewing function which is required is that which prevents unscrewing of the first component with respect to the second component. By way of example, coupling type tubes measure between 0.2 and 0.7 meters and great length tubes measure between 6 and 15 meters.

In accordance with a first embodiment detailed in FIGS. 2, 4 and 7, the means for free rotation comprise grooves 11, 21 which are excavated perpendicularly to the axis of revolution 4 in said male and female threaded zones 10, 20 of the first and third tubular component, such that once said male and female threaded zones have been made up one into the other, each interposed zone defined by two consecutive grooves provided on one of said threaded zones faces a groove provided on the other threaded zone. More precisely, a portion of the male and female threaded zones 10, 20 of the first and third tubular components has been cut off by the grooves. For this reason, when each of the interposed zones defined by two consecutive grooves of the male threaded zone faces a groove of the female threaded zone, the male end of the first component is freely rotational in the female end of the third component, ignoring friction. However, it is possible to continue advancing the first component into the third by applying a force to screw the first component into the third in order to continue meshing the first component with the third. This force is necessitated because meshing of the components tends to be cancelled out since the threaded zones have been cut off by the grooves.

Another embodiment is possible if the threaded zones of the first component are offset with respect to the third component, so that at the end of makeup, the threaded zone of the first component faces a broad groove produced on the internal circumferential surface of the third component and the threaded zone of the third component faces a broad groove formed on the external circumferential surface of the first component. The threaded zones of the first and third components would then no longer be meshed with into the other. This other embodiment is less optimized than the first mode since the threaded zones would no longer be completely engaged with each other. In the case of tension, the stresses will no longer be distributed over the entirety of the threaded zones but only over one thread of the first and third components.

Advantageously, the first embodiment of the means for free rotation exhibits grooves which are regularly disposed in a lead which is substantially equal to 1.5 times the lead of the threaded zones 10, 20. This means that a homogeneous distribution of contacts between the threads of the threaded zones is guaranteed. Preferably, the grooves exhibit the same width over the threaded zones of the first and third components. Thus, they have a width equal to 0.75 times the lead of the threaded zones 10, 20.

In accordance with a preferred embodiment, the terminal surfaces 15, 35 of the male ends 1, 3 of the first and second tubular components each comprises a circular portion 14, 34 provided with inclined facets 140 disposed in a concentric manner, such that said portions 14, 34 fit into each other. This type of direct drive dog clutch allows progressive fitting of the circular portions. It should be noted that the direction of the inclination of the facets must be selected so that the portions 14 and 34 can be fitted during screwing of the components. In addition, the inclination of the facets must be selected so as to be sufficiently large so that fixing of the male components using the direct drive dog clutch is sufficient. In particular, the angle of inclination of the facets must be greater than the helix angle of the threaded zone 20'. The choice of a design for the circular portion that is provided with concentric and inclined facets is important, as it enables machining to be carried out easily using a lathe.

Advantageously, the terminal surfaces 15, 35 of the male ends 1, 3 of the first and second tubular components each comprise a sealing surface 13, 33 which can co-operate one with the other to form a metal/metal seal. In fact, in the case in which the connection has to be tight, it is necessary to produce sealing surfaces which can come into tightening contact, at the first and third components as well as at the second and third components. Thus, it is necessary to displace these sealing surfaces, which are normally produced on the circumferential surfaces of the components, to the terminal surfaces. In fact, since the first component has to be freely rotational with respect to the third, tightening contact is not possible.

Concerning the type of sealing surfaces 13, 33, reference can be made to conventional sealing surfaces in the field under consideration. They may be cone-on-cone sealing surfaces or toroid-on-cone surfaces or toroid-and-cone-on-cone as described in applications WO-03/048623 or WO-04/109173, which are herein incorporated by reference.

These sealing surfaces act to prevent the movement of fluid between the inside and the outside of the connection. The angle of taper of the sealing surfaces may be in the range 1° to 45°, preferably in the range 3° to 20°, for example 6°.

Advantageously, the terminal surfaces 15, 35 of the male ends 1, 3 of the first and second tubular components each comprises an abutment surface 12, 32 which can co-operate one with the other by tightening. Because the first and second components have been fixed in rotation by fitting at their terminal surface, it is not possible to provide an abutment surface anywhere else apart from on said terminal surfaces. These abutment surfaces have the advantage of accommodating a large proportion of the makeup torque and thus of loading the threaded zones. It will be noted that this is particularly pertinent for the threaded zones of the first and third components which have been partially cut off by the grooves.

Advantageously, the abutment surfaces 12 and 32 may be radial, and more precisely in a plane perpendicular to the axis 4 of the connection, or they may be inclined by an angle of up to 45° with respect to a radial plane. In the example illustrated in FIG. 1, the angle is of the order of 15° to 25°.

Advantageously and for each terminal surface 15, 35, the sealing surface 13, 33 has been disposed between the circular portion 14, 34 and the abutment surface 12, 32. The circular portion 14, 34 is that which is furthest from the axis 4 of the connection and the abutment surface 12, 32 is that which is closest to the axis 4.

Advantageously, the male threaded zones as well as their corresponding female threaded zone have a taper generatrix which can facilitate mutual makeup of the tubular components. The taper generatrix could, for example, have a half-angle in the range 0.5° to 3°, preferably in the range 1° to 2°.

Makeup of an assembly comprising the first, second and third components is carried out as follows:
firstly, the first component the male threaded zone of which is provided with means for free rotation is screwed into the corresponding female threaded zone of the third component until said components are freely rotational with respect to each other. In the case in which the means for free rotation are grooves 11, 21, the first component can turn independently of the third component when each interposed zone defined by two consecutive grooves provided on one of said threaded zones faces a groove provided in the other threaded zone;
then the second component is screwed into the corresponding female threaded zone of the third component until the terminal surfaces 15, 35 of the first and second tubular components are fitted one in the other. Fitting is rendered possible by the free rotation of the first tubular component;

finally, the third component is screwed with the first and second components being firmly fitted together, to a predetermined torque C0.

The torque C0 is selected as a function of the dimensions of the tubular components and the intended application (drilling, work-over riser, etc).

In the case in which the threaded zones have a taper generatrix, making up of the first component into the third component is stopped when the thread roots lock against the corresponding thread crests. At this time too, the first component comes into free rotation with respect to the third component.

In the case in which the threaded zones are cylindrical, making up of the first component into the third component is stopped by abutment surfaces provided on the first and third components.

In order to break out the connection, the method to be followed is as follows:

In the case in which the first and second components have opposite handed threaded zones, the male first tubular component can be unscrewed from the female third component, said first component then causing unscrewing of the second component from the third. It is also possible to unscrew the male second tubular component from the first and third components to disengage the direct drive dog clutch linkage, said second component driving the first component in rotation with respect to the third component. Next, the first component is broken out from the third component.

In the case in which the threaded zones of the first and second components have the same hand, the male first tubular component cannot be unscrewed from the female third component, said first component then causing makeup of the second component into the third. It is firstly necessary to break out the male second tubular component from the female third component, said second component entraining the first in free rotation, then to break out the first component from the third component.

The connection is of particular application to risers. These risers, which connect the surface of the sea to the bottom, are particularly prone to the problem of breakout due to swells and sea currents which subject the strings of components to torsional stresses. Thus, it is advantageous to use tubes connected by "T&C" couplings and comprising threaded zones with the same hand. In fact, breakout of a connection can only be accomplished by holding the coupling and breaking out the second tube from the coupling.

The invention claimed is:

1. An assembly for producing a threaded connection, comprising:
   a first and a second tubular component with a same axis of revolution, each respectively including at one of its ends a male threaded zone produced on its external circumferential surface, said ends each respectively finishing in a terminal surface comprising a structure, the structures forming together a direct drive dog clutch device so as to fix the first and second tubular components in rotation; and
   a third tubular component which also includes the axis of revolution and includes at each of its ends, on its internal circumferential surface, a female threaded zone,
   one of the two male threaded zones being cooperable by screwing with one of the two female threaded zones while the other male threaded zone is cooperable by screwing with the other female threaded zone,
   wherein the male threaded zone of the first tubular component and the corresponding female threaded zone of the third tubular component comprise a free rotation mechanism such that at an end of makeup of said male threaded zone into said female threaded zone, the tubular components carrying said male and female threaded zones are freely rotational with respect to each other,
   wherein the free rotation mechanism is distinct from the direct drive dog clutch device,
   wherein the free rotation mechanism comprises more than three grooves which are excavated perpendicularly to the axis of revolution in said male and female threaded zones, such that once said male and female threaded zones have been made up one into the other, each interposed zone defined by two consecutive grooves provided on one of said threaded zones faces a groove provided on the other threaded zone,
   the grooves being disposed regularly at a lead which is substantially equal to 1.5 times a lead of the threaded zones, and the grooves including a same width equal to 0.75 times the lead of the threaded zones, and
   wherein the male and female threaded zones remain engaged after makeup when free rotation occurs.

2. An assembly for producing a threaded connection in accordance with claim 1, wherein the male threaded zones are orientated in opposing directions with respect to each other.

3. An assembly for producing a threaded connection according to claim 1, wherein the third tubular component length is at least 10 times shorter than the first two components.

4. An assembly for producing a threaded connection according to claim 1, wherein the terminal surfaces of the male ends of the first and second tubular components each comprise a circular portion including inclined facets disposed in a concentric manner, such that said portions, which thus constitute the direct drive dog clutch device, fit one into the other.

5. An assembly for producing a threaded connection according to claim 1, wherein the terminal surfaces of the male ends of the first and second tubular components each comprise a sealing surface which is cooperable one with the other to form a metal/metal seal.

6. An assembly for producing a threaded connection according to claim 5, wherein the terminal surfaces of the male ends of the first and second tubular components each comprise an abutment surface which is cooperable one with the other by tightening.

7. An assembly for producing a threaded connection according to claim 6, wherein on each terminal surface, the sealing surface is disposed between a circular portion and the abutment surface, the circular portion being further from the axis of revolution than the abutment surface.

8. An assembly for producing a threaded connection according to claim 1, wherein the male threaded zones and their corresponding female threaded zone exhibit a taper generatrix so as to facilitate mutual makeup of the tubular components.

9. An assembly for producing a threaded connection according to claim 1, wherein the free rotation mechanism is provided so that at the end of makeup of said male threaded zone into said female threaded zone, the tubular components carrying said male and female threaded zones are freely rotational with respect to each other without any relative axial movement between the tubular components carrying said male and female threaded zones.

10. A method for producing a connection by making up an assembly in accordance with claim 1, comprising:
   screwing the first component the male threaded zone of which is provided with the free rotation mechanism into the corresponding female threaded zone of the third component until said components are freely rotational with respect to each other;
   then screwing the second component into the corresponding female threaded zone of the third component until the terminal surfaces of the first and second tubular components are fitted one in the other, said fitting being rendered possible by the free rotation of the first tubular component;
   then screwing the third component with the first and second components being firmly fitted together, to a predetermined torque.

11. A method for breaking out a connection obtained using the method claimed in claim 10, comprising:
   unscrewing the male second tubular component from the first and third components;
   then unscrewing the first component from the third component.

12. An assembly for producing a threaded connection, comprising:
   a first and a second tubular component with a same axis of revolution, each respectively including at one of its ends a male threaded zone produced on its external circumferential surface, said ends each respectively finishing in a terminal surface comprising a structure, the structures forming together a direct drive dog clutch device so as to fix the first and second tubular components in rotation; and
   a third tubular component which also includes the axis of revolution and includes at each of its ends, on its internal circumferential surface, a female threaded zone,
   one of the two male threaded zones being cooperable by screwing with one of the two female threaded zones while the other male threaded zone is cooperable by screwing with the other female threaded zone,
   wherein the male threaded zone of the first tubular component and the corresponding female threaded zone of the third tubular component comprise a free rotation mechanism such that at an end of makeup of a threading of said male threaded zone being meshed with a threading of said female threaded zone, the tubular components carrying said male and female threaded zones are freely rotational with respect to each other,
   wherein the free rotation mechanism is distinct from the direct drive dog clutch device,
   wherein the free rotation mechanism comprises more than three grooves which are excavated perpendicularly to the axis of revolution in said male and female threaded zones, such that once said male and female threaded zones have been made up one into the other, each interposed zone defined by two consecutive grooves provided on one of said threaded zones faces a groove provided on the other threaded zone,
   the grooves being disposed regularly at a lead which is substantially equal to 1.5 times a lead of the threaded zones, and the grooves including a same width equal to 0.75 times the lead of the threaded zones, and
   wherein the male and female threaded zones remain engaged after makeup when free rotation occurs.

* * * * *